J. Schiffer,
Preparing Hides,
No. 66,640. Patented July 9, 1867.
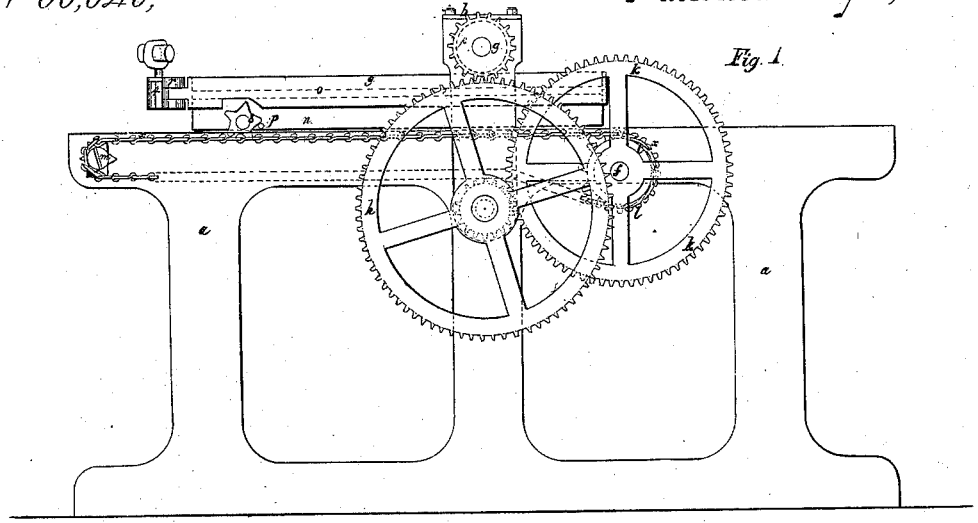
Fig. 1.
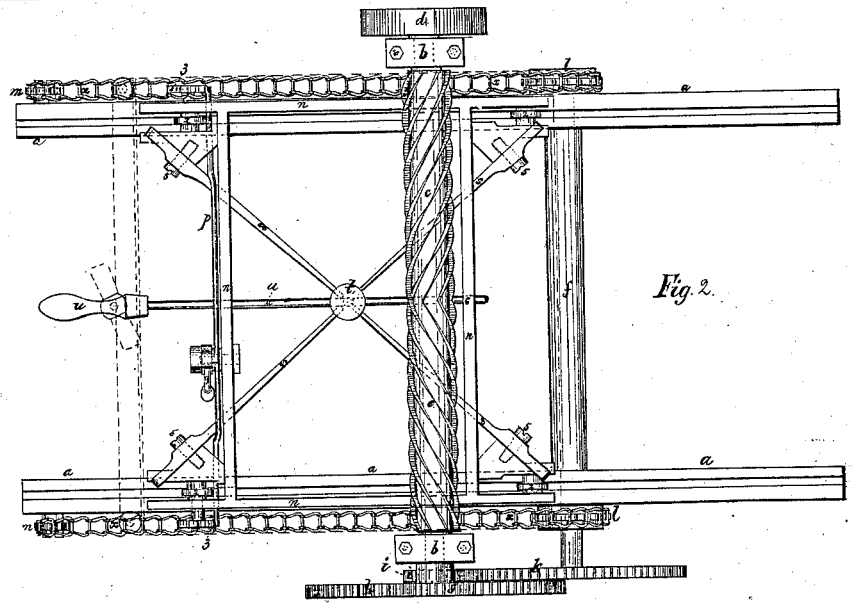
Fig. 2.
Fig. 4.  Fig. 3. 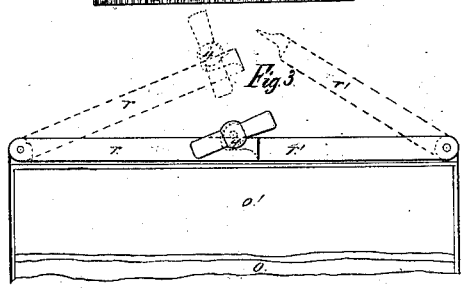 Fig. 5. 
Witnesses.
Geo. D. Walker
Chas. H. Smith
Inventor.
John Schiffer

United States Patent Office.

JOHN SCHIFFER, OF NEW YORK, N. Y., ASSIGNOR TO HIMSELF AND MEYER & MUELLER, OF THE SAME PLACE.

Letters Patent No. 66,640, dated July 9, 1866.

---

IMPROVED MACHINE FOR DRESSING HIDES AND SKINS.

---

*The Schedule referred to in these Letters Patent and making part of the same.*

---

TO ALL WHOM IT MAY CONCERN:

Be it known that I, JOHN SCHIFFER, of the city and State of New York, have invented, made, and applied to use a certain new and useful improvement in Machines for Dressing Hides and Skins; and I do hereby declare the following to be a full, clear, and exact description of the said invention, reference being had to the annexed drawing, making part of this specification, wherein—

Figure 1 is a side elevation of my said machine.

Figure 2 is a plan of the same with the bed removed, its position being shown by red lines; and Figure 3 is a plan of one end of the bed.

Similar marks of reference denote the same parts.

The object of this invention is to provide means for scraping off the hair from the hide, and cutting or dressing off the fat or fleshy portions on the inside of the hide, with great rapidity and without injury to the skin. I provide a bed, upon which the hide or skin is laid, and clamped at one end of the bed and near the middle of the skin; and this bed is gradually moved along beneath a rotary scraper, and pressed, by the action of levers beneath the bed, up into contact with said scraper by the attendant, with the required force, and a stream of water is to be allowed to run upon the skin to wash off the refuse matter. When one end of the skin or hide has been thus dressed, the same is loosened from its clamp and turned end for end, and the dressing completed. The scraper employed for the hair side of the hide is dull, the edge being rounded, and that for the flesh side is made with the edge sufficiently sharp for removing the fatty portions. With both rotary scrapers the knives are made of screw form, diverging from the centre, so as to spread the hide or skin widthwise.

In the drawing, $a$ represents the side frames of the machine, supporting the journal-boxes $b\ b$ of the revolving scraper $c$, rotated by competent power applied to the pulley $d$ or to a crank-handle. The blades of the scraper $c$ are made in a screw or inclined form, diverging from the centre, so as to spread the hide or skin widthwise by their revolution, and in Figure 4 a section of the scraper adapted to the hair side is shown, in which the edges are rounded, while in Figure 5 a section is shown of the scraper adapted to the flesh side, the edges being sufficiently sharp to remove the fatty portions of the hide or skin. $f$ is a shaft across between the frames $a\ a$, rotated by the gearing $g\ h\ i\ k$ from the shaft of the scraper $c$, and $l\ l$ are chain-wheels on said shaft $f$, over which the endless chains $x$ pass to the guide-wheels $m\ m$. These chains draw along the frame $n$ that carries the bed $o$ upon which the hide or skin is laid. The frame $n$ is fitted to slide in grooves in the upper edges of the frames $a\ a$, being guided upon and sustained by the rollers 2 2, if desired. $p\ p$ are bolts standing crosswise of the frame $n$, and operated by a lever, $q$, and the ends of these bolts can be projected by said lever into the teeth of the chain-pinions 3 3, to prevent them from turning, so that the chains $x$, holding upon the teeth of said pinions 3 3, shall draw along the bed; but when said bolts are drawn in by the lever $q$, the pinions 3 3 can turn without the chains moving the bed along, thus allowing the scraper to continue to revolve and the chains to move, but keeping the bed stationary while the hide or skin is being adjusted. The bed $o$ is formed of a flat surface of suitable material, metal preferred, upon which is a layer of India rubber, $o'$, sufficiently thick to yield to inequalities in the hide as it may pass under the scraper, and thereby prevent injury to said hide, and also to aid in keeping the hide or skin in its proper position, by preventing its slipping upon the surface of the bed. This bed is formed with clamps $r\ r'$ at the front end, hinged at the angles, so as to be closed after the hide is laid with about one-half of it upon the bed $o$. The end of the piece $r'$ passes in behind an eccentric, 4, as the clamp is closed, and said eccentric 4 being turned, clamps the hide, by bringing the portions of the bars $r$ and $r'$ that lap upon each other nearly into a straight line, straightening the face of the clamp and pressing it against the hide. The bed $o$ is formed with flanged edges setting down over the frame $n$, and in this frame $n$ are four levers $s$, with their fulcra at 5. These unite in the centre at the coupling-cylinder $t$, that receives between its flanges the ends of the levers $s$, and is itself set upon the hand-lever $u$, that has its fulcrum at 6, so that the attendant can raise or lower the bed $o$ by the levers $s$ acting at the four corners thereof; and the coupling-cylinder $t$, setting loosely between the levers $s$, allows the attendant to move the lever $u$ slightly sidewise as well as up or down, to cause the pair of levers $s$ on one side to operate more in raising the bed $o$ than on the other side. After the hide has been placed on the bed $o$ and clamped, it is to be run back under the scraper, the bed $o$ being lowered so that said scraper does not operate; then the bolts $p$ are projected, and the chains $x$ bring the bed forward by a regular progressive movement, and the attendant, by the lever $u$, gives the necessary pressure for the scraper to act in removing the hair or dressing the flesh side of the hide. A stream of water is supplied to wash away the refuse material from the surface of the hide or skin.

What I claim, and desire to secure by Letters Patent, is—

1. The bed $a'$, fitted with the clamps $r\ r'$, in the manner specified, in combination with the rotary scraper $c$, formed with diverging blades, as and for the purposes set forth.

2. I claim the bed $o$, having an elastic surface, upon which the hide or skin is to be laid, in combination with the rotary scraper $c$, substantially as and for the purposes set forth.

3. I claim the levers $s$ and $u$, and frame $n$, in combination with the bed $o$, as and for the purposes set forth.

4. I claim the bolts $p\ p$ and pinions 3 3, in combination with the chains $x\ x$ and frame $n$, for the purposes and as set forth.

In witness whereof I have hereunto set my signature this fourth day of April, A. D. 1867.

JOHN SCHIFFER.

Witnesses:
CHAS. H. SMITH,
GEO. D. WALKER.